UNITED STATES PATENT OFFICE.

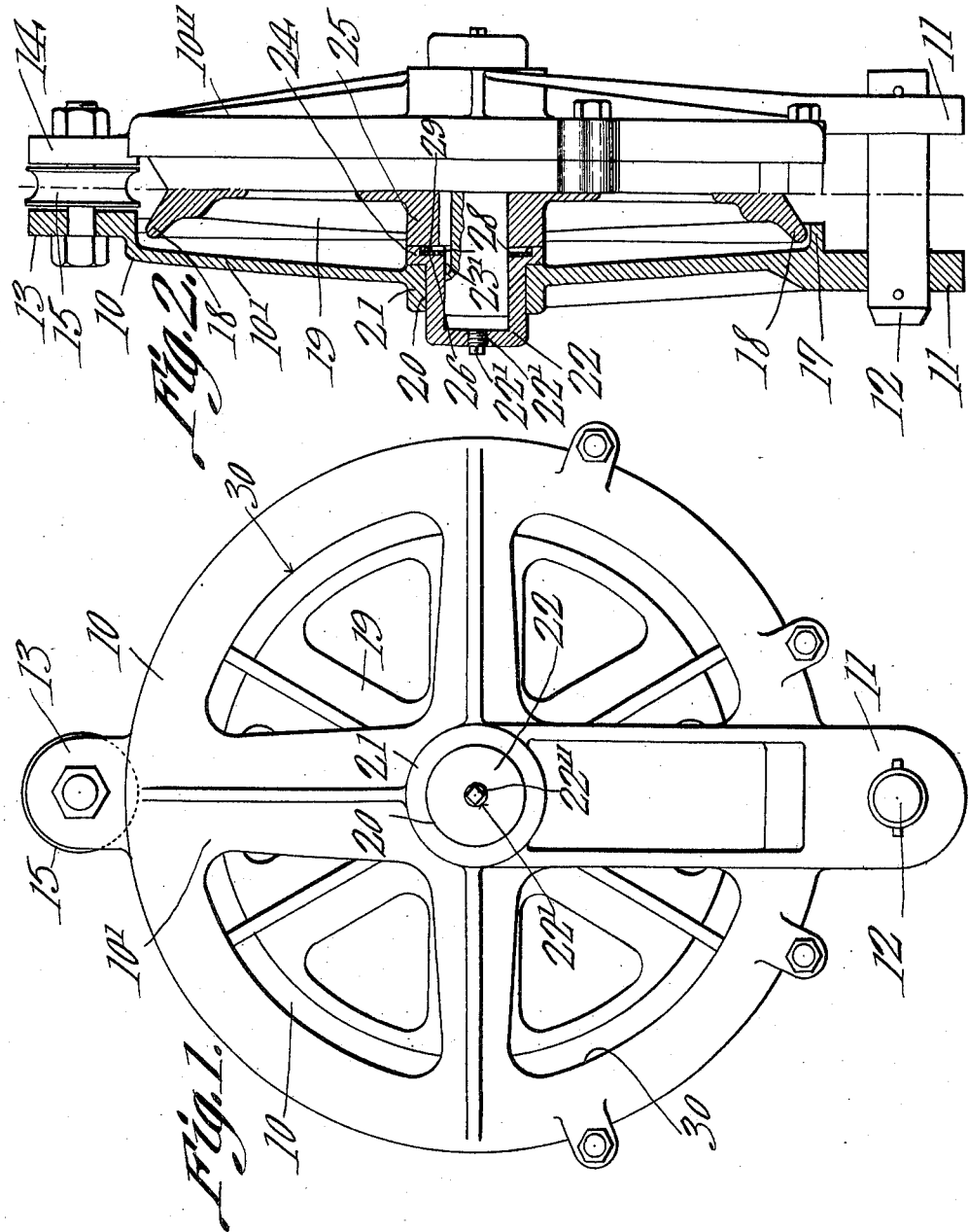
J. G. FAIRBANKS.
SHEAVE BLOCK.
APPLICATION FILED JUNE 3, 1911.
1,032,593.
Patented July 16, 1912.

JAMES G. FAIRBANKS, OF MARION, OHIO.

SHEAVE-BLOCK.

1,032,593.

Specification of Letters Patent.

Patented July 16, 1912.

Application filed June 3, 1911. Serial No. 630,990.

*To all whom it may concern:*

Be it known that I, JAMES G. FAIRBANKS, a citizen of the United States, residing at Marion, in the county of Marion and State of Ohio, have invented a new and useful Sheave-Block, of which the following is a specification.

This invention relates to an improvement in sheave blocks.

The primary object of said invention is to provide a sheave block for excavating buckets which are used for work under water, the construction being such as to prevent the sand and gravel from becoming lodged in the bearings which support the sheave.

A further object of the invention is to provide means for lubricating the sheave bearings and to so construct the sheave housing as to prevent the cable from working in between said housing and the sheave.

In the drawings: Figure 1 is a side elevation of the sheave, and Fig. 2 is an end view partly in section.

The sheave housing 10 is formed in two sections 10' and 10'', each section being provided with an extension 11, which extensions are connected by a pin 12. Arranged diametrically opposite the extension 11 are a plurality of ears 13 and 14 between which are positioned a small sheave or roller 15, said roller extending slightly within the casing formed by the sections 10' and 10'', this roller or sheave 15 being arranged to contact with the cable passing over the main sheave, the secured end of the cable being passed over the small sheave 15 and secured to the main hoisting cable. Each of the sections which form the housing are provided with the inwardly extending flanges 17 which overhang the flared extensions 18 of the large sheave 19 over which the cable passes absolutely preventing the cable from entering the space between the sheave and the casing.

Each of the sections which form the casing is provided with central openings 20, and bosses 21, and arranged to extend within the openings 20 are the cups 22 which receive and support the end portions of the shaft 23 on which the sheave 17 is keyed. Each of the cups 22 are provided with the recessed annular flanges 24 which are of a diameter equal to the diameter of the bosses 25 which are formed integral with the web of the sheave 19, the annular flanges formed on the cups and said bosses forming a continuous surface, the flanges 24 preventing the displacement of the cups while the sheave 19 is in position. Arranged in the recesses 26 formed in the annular flanges are fabric washers 28 which are held in place by means of coil springs 29. The cups 22 are provided with apertures 22' which are normally closed by means of screw plugs 22''. The sheave supporting shaft extends to a point adjacent the end walls of the cups 22 and the space between the end portion of said shaft and end walls is adapted to contain a lubricant which may be introduced through the aperture 22', said lubricant as the shaft is rotated gradually working between the side walls of the cup and the shaft, thus lubricating the same and by means of the duct 23' arranged in the shaft the same enters the annular recess formed in the annular flange 21', saturating the fabric washer and being fed to the end portion of the boss which is formed integral with the web or hub of the sheave 19 thus lubricating the ends of said boss and facilitating the rotation of the sheave and shaft on which the same is keyed.

Particular attention is called to the fact that the annular extensions formed integral with the cups which receive the end portions of the shaft practically form a continuation of the hub which is formed integral with the web of the sheave, thus preventing foreign material from entering through the openings 30 in the members 10' and 10'' becoming lodged between the shaft and its support or between the sheave and the casing at a point which would either cause wear or impede the rotation of the sheave. This construction is of particular advantage where the block is used under water as the material which would normally wear away the bearings is effectually excluded from any point where friction would occur.

The advantages of a sheave block of this character will be clearly apparent as it will be noted that the various parts may be economically manufactured and readily assembled.

What is claimed is:—

In a sheave block, a casing formed in two sections, a plurality of cups supported by said casing, said cups being of a diameter to extend within openings formed in said casing sections, the cups being formed with annular recessed flanges, each of said casings being formed with a boss adjacent the cup-receiving openings, said boss and the flange of the adjacent cup being co-extensive, a shaft, said cups supporting the end portions of said shaft and a sheave mounted on said shaft, said sheave being formed with hub portions co-extensive with the peripheries of the annular recessed flanges, the recesses of said flanges being adapted to contain a lubricant.

In testimony that I claim the foregoing as my own, I have hereto affixed my signature in the presence of two witnesses.

JAMES G. FAIRBANKS.

Witnesses:
M. P. KELLY,
C. W. FAIRBANKS.